US 012462295B2

(12) United States Patent
Sheikh et al.

(10) Patent No.: US 12,462,295 B2
(45) Date of Patent: Nov. 4, 2025

(54) DISTRIBUTED COMPUTER SYSTEM AND METHOD ENABLING APPLICATION OF AUTONOMOUS AGENTS

(71) Applicant: FETCH.AI LIMITED, Bury St Edmunds (GB)

(72) Inventors: Humayun Munir Sheikh, Bury St Edmunds (GB); Attila Bagoly, Bury St Edmunds (GB)

( * ) Notice: Subject to any disclaimer, the term of this patent is extended or adjusted under 35 U.S.C. 154(b) by 94 days.

(21) Appl. No.: 18/483,515

(22) Filed: Oct. 9, 2023

(65) Prior Publication Data

US 2024/0037646 A1 Feb. 1, 2024

Related U.S. Application Data

(63) Continuation-in-part of application No. 18/318,897, filed on May 17, 2023, which is a continuation-in-part (Continued)

(51) Int. Cl.
*G06Q 30/02* (2023.01)
*G06Q 20/02* (2012.01)
(Continued)

(52) U.S. Cl.
CPC ............ *G06Q 30/08* (2013.01); *G06Q 20/02* (2013.01); *G06Q 20/223* (2013.01);
(Continued)

(58) Field of Classification Search
CPC ...... G06Q 30/08; G06Q 20/02; G06Q 20/223; G06Q 30/0609; G06Q 30/0207–30/0277; H04L 9/0618; H04L 9/3236; H04L 9/3239; H04L 9/3297; H04L 9/50; H04L 2209/56; H04L 9/0643; H04L 63/102; H04L 63/126; G06N 5/043; G06N 3/0475; G06N 20/00; G06F 16/275
See application file for complete search history.

(56) References Cited

U.S. PATENT DOCUMENTS

| | | | | |
|---|---|---|---|---|
| 6,144,739 A | * | 11/2000 | Witt | H04L 63/123 380/278 |
| 7,676,539 B2 | * | 3/2010 | Jhoney | G06Q 10/10 705/37 |

(Continued)

FOREIGN PATENT DOCUMENTS

WO WO-2018126065 A1 * 12/2016

*Primary Examiner* — Thuy N Nguyen
(74) *Attorney, Agent, or Firm* — RC Trademark Company

(57) ABSTRACT

The present disclosure provides a distributed computer system that comprises worker nodes that are coupled together via a data communication network to exchange data therebetween, wherein the worker nodes include computing arrangements and local databases to process and store data therein. The worker nodes are autonomous agents (AAs), wherein the distributed computer system is configured to use the worker nodes for fulfilling a service request. The distributed computer system also comprises a processing arrangement that generates a bloom tree, driven by cryptographic hash values, ensuring accurate autonomous agent functionality identification, while proof-based decision-making enhances task execution.

16 Claims, 3 Drawing Sheets

Related U.S. Application Data of application No. 17/234,932, filed on Apr. 20, 2021, which is a continuation of application No. 16/130,218, filed on Sep. 13, 2018, now abandoned.

(60) Provisional application No. 62/557,841, filed on Sep. 13, 2017.

(51) Int. Cl.
*G06Q 20/22* (2012.01)
*G06Q 30/0601* (2023.01)
*G06Q 30/08* (2012.01)
*H04L 9/06* (2006.01)
*H04L 9/32* (2006.01)
*H04L 9/00* (2022.01)

(52) U.S. Cl.
CPC ....... *G06Q 30/0609* (2013.01); *H04L 9/0618* (2013.01); *H04L 9/3236* (2013.01); *H04L 9/3239* (2013.01); *H04L 9/3297* (2013.01); *H04L 9/50* (2022.05); *H04L 2209/56* (2013.01)

(56) References Cited

U.S. PATENT DOCUMENTS

| | | | | |
|---|---|---|---|---|
| 8,041,706 B2* | 10/2011 | Agrawal | ............ | G06F 16/2471 713/193 |
| 8,224,935 B1* | 7/2012 | Bandopadhyay | ..... | G06F 9/5072 709/248 |
| 8,589,574 B1* | 11/2013 | Cormie | ................... | H04L 67/10 709/230 |
| 9,380,024 B2* | 6/2016 | Schmidt | .................. | G06F 21/64 |
| 9,419,854 B1* | 8/2016 | Wang | .................. | H04L 41/0654 |
| 10,579,974 B1* | 3/2020 | Reed | ..................... | G06Q 20/065 |
| 10,951,540 B1* | 3/2021 | De Kadt | .............. | H04L 47/70 |
| 11,741,238 B2* | 8/2023 | Rioux | ..................... | G06F 21/54 726/23 |
| 2008/0065910 A1* | 3/2008 | Agrawal | ............. | G06F 16/2471 713/193 |
| 2010/0082513 A1* | 4/2010 | Liu | ..................... | H04L 63/1458 706/46 |
| 2011/0087625 A1* | 4/2011 | Tanner, Jr. | ............. | G06N 20/00 706/12 |
| 2012/0254286 A1* | 10/2012 | Harlow | .................. | C09B 43/06 709/202 |
| 2013/0010950 A1* | 1/2013 | Kerschbaum | ......... | H04L 9/3218 380/30 |
| 2013/0073858 A1* | 3/2013 | Lim | ........................ | H04L 9/007 713/176 |
| 2015/0215350 A1* | 7/2015 | Slayton | .................. | G06F 9/453 709/204 |
| 2015/0295720 A1* | 10/2015 | Buldas | .................. | H04L 9/3247 713/176 |
| 2016/0307117 A1* | 10/2016 | Yang | ................... | G06F 16/2465 |
| 2018/0007131 A1* | 1/2018 | Cohn | .................. | H04L 67/1068 |
| 2018/0117447 A1* | 5/2018 | Tran | ..................... | G09B 19/0038 |
| 2018/0285979 A1* | 10/2018 | Chessell | ................ | G06Q 40/08 |
| 2018/0349879 A1* | 12/2018 | High | ................... | G06Q 20/3827 |
| 2020/0026286 A1* | 1/2020 | Vozar | ..................... | G07C 5/008 |
| 2021/0240191 A1* | 8/2021 | Cesafsky | ............... | G06N 3/006 |

\* cited by examiner

DISTRIBUTED COMPUTER SYSTEM AND METHOD ENABLING APPLICATION OF AUTONOMOUS AGENTS

CROSS-REFERENCE TO RELATED APPLICATIONS

This application is a continuation-in-part of U.S. patent application Ser. No. 18/318,897, titled "SYSTEM AND METHOD ENABLING APPLICATION OF AUTONOMOUS AGENTS" and filed on May 17, 2023, which is incorporated herein by reference.

TECHNICAL FIELD

The present disclosure relates to distributed computer systems. Moreover, the present disclosure relates to methods of operating the distributed computer systems.

BACKGROUND

The field of distributed computing has undergone remarkable transformations in recent years, driven by the ever-increasing demand for efficient and scalable systems capable of handling complex service requests. With the advent of cloud computing, Internet of Things (IoT), and the proliferation of data-driven applications, the expectations from the distributed computing have reached unprecedented levels. Whether it's the real-time processing of massive datasets, the management of autonomous devices, or the delivery of on-demand services, the distributed computing landscape is under constant pressure to deliver on said demands.

Existing systems make use of search and discovery databases to identify and deploy the autonomous agents for fulfilling service requests of users. However, the existing systems fail to fulfil the escalating demand for storage space. Additionally, expanding memory to the autonomous agents, translates into heightened hardware costs for the existing systems.

Moreover, existing known techniques for searching and managing the functionality of each autonomous agent suffer from time inefficiencies, resulting in reduced system responsiveness. There exist some systems that use probabilistic data structures (such as bloom filters) for searching and managing the functionality of each autonomous agent. However, such probabilistic data structure consists of hash functions that occasionally map different autonomous agents' functionalities to a common location (referred to as a hash collision), leading to the generation of false positives.

Therefore, in light of the foregoing discussion, there exists a need to overcome the aforementioned drawbacks.

SUMMARY

The aim of the present disclosure is to provide a distributed computer system and a method to efficiently manage and record the functionalities of autonomous agents while mitigating growing storage demands thereof. The aim of the present disclosure is achieved by a distributed computer system and a method of operating the distributed computer system as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
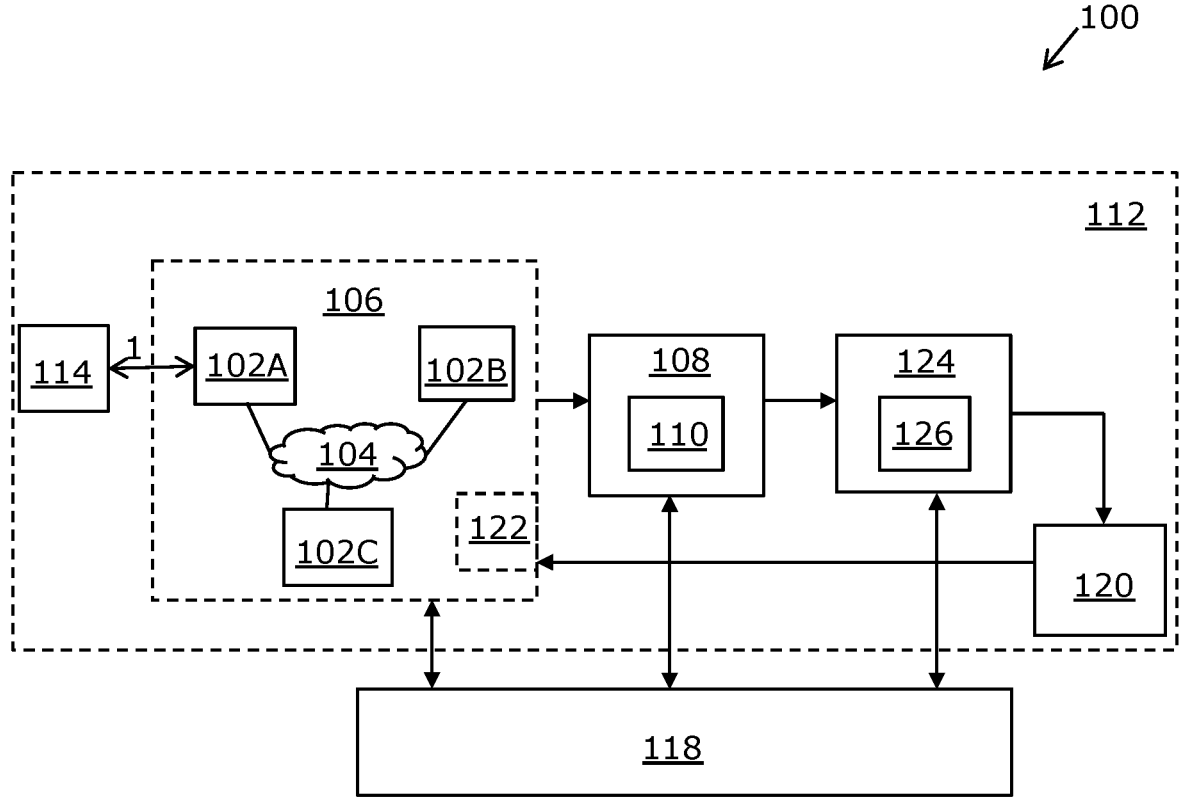
FIG. 1 is an illustration of a distributed computer system, accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a distributed computer system that comprises worker nodes that are coupled together via a data communication network to exchange data therebetween, wherein the worker nodes include computing arrangements and local databases to process and store data therein, wherein the worker nodes are autonomous agents (AAs), wherein the distributed computer system is configured to use the worker nodes for fulfilling a service request, the distributed computer system further comprising:

a processing arrangement configured to generate a bloom tree comprising cryptographic hash values, wherein each cryptographic hash value represents a functionality of an autonomous agent of plurality of autonomous agents, a software framework, wherein the software framework comprises:

a client-agent device configured to receive the service request, to generate an objective associated with the service request and to send the objective to at least one autonomous agent and at least one machine-learning model comprised in at least one of the autonomous agents, configured to generate tasks related to the objective received from the at least one autonomous agent and to send the tasks to the at least one autonomous agent, wherein the at least one autonomous agent is configured to:

execute a pre-processing operation to generate a plurality of proof values corresponding to the tasks and to send the plurality of proof values to the processing arrangement, execute instructions to configure the processing arrangement to identify a list of associated autonomous agents by mapping a given proof value to the bloom tree, and receive from the processing arrangement the list of associated autonomous agents, wherein the associated autonomous agents are configured to perform the tasks required to fulfil the service request.

The first aspect of the invention introduces the distributed computer system comprising the plurality of autonomous agents (AAs) connected via the data communication network, offering efficient resource utilization and dynamic task assignment. The system comprises the software framework with the client-agent device and the machine-learning models within the plurality of autonomous agents, facilitating precise task allocation. Moreover, the system comprises the processing arrangement that generates the bloom tree, driven by cryptographic hash values, ensuring accurate autonomous agent functionality identification, while proof-based decision-making enhances task execution. Furthermore, the scalable memory management, achieved by storing root hashes of bloom trees, addresses growing storage demands. It will be appreciated that the aforementioned features synergistically optimize resource utilization, dynamic task allocation, precise agent selection, efficient task execution, and memory management, making the system ideal for fulfilling the service requests. Moreover, the system provides tamper-proof recordation of functionalities of the plurality of worker nodes using the concept of invertible bloom filter. The present disclosure seeks to improve how each of the plurality of worker nodes functions to handle ever growing storage requirements (i.e., to improve memory space management in each worker node by such as the cryptographic hash values are stored in the memory that require only a fraction of the storage that existing systems and method needs).

In a second aspect, the present disclosure provides a method of operating a distributed computer system that comprises worker nodes that are coupled together via a data communication network to exchange data therebetween, wherein the worker nodes include computing arrangements and local databases to process and store data therein, wherein the worker nodes are autonomous agents (AAs), wherein the distributed computer system is configured to use the worker nodes for fulfilling a service request, the method further comprising:

- executing a first set of instructions on a processing arrangement to generate a bloom tree comprising cryptographic hash values, wherein each cryptographic hash value represents a functionality of an autonomous agent of the plurality of autonomous agents,
- receiving, at a client-agent device, the service request and generating an objective associated with the service request and sending the objective to at least one autonomous agent, wherein a software framework is implemented, wherein the software framework comprises the client-agent device,
- generating, at a machine-learning model comprised in at least one of the autonomous agents configured to generate tasks related to the objective received from the at least one autonomous agent and sending the tasks to the at least one autonomous agent,
- configuring the at least one autonomous agent for:
  - executing a pre-processing operation to generate a plurality of proof values corresponding to tasks and sending the plurality of proof values to the processing arrangement,
  - executing a second set of instructions on the processing arrangement to identify a list of associated agents by mapping a given proof value to the bloom tree, and receiving from the processing arrangement the list of associated autonomous agents, and
- executing the instructions on the associated autonomous agents to perform the tasks required to fulfil the service request.

The second aspect of the present disclosure provides the method that introduces a streamlined approach to encapsulating autonomous agent capabilities, enhancing efficiency. The method comprises generating the bloom tree using cryptographic hash values, providing an organized functionality representation. Moreover, the subsequent steps of the method, including the generation of objectives associated with the service requests and the generation of the task by the machine-learning models, facilitate a highly responsive and context-aware approach to task assignment. The synergy between the objective generation and the task generation ensures that the most suitable autonomous agents are selected to fulfill the service requests promptly. Furthermore, the method uses the pre-processing operation, combined with cryptographic hash values, strengthens security and accuracy in selection of the autonomous agent. It will be appreciated that mapping the plurality of proof values to the bloom tree minimizes false positives, enhancing efficiency and reliability of the distributed computer system.

Throughout the present disclosure, the term "distributed computer system" as used herein refers to a networked arrangement of multiple worker nodes interconnected through a data communication network. The worker nodes include computing arrangements that are operable to respond to, and processes instructions and data therein. The computing arrangements may include, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the computing arrangements can be one or more individual processors, processing devices and various elements associated with a processing device that may be shared by other processing devices. Additionally, the computing arrangements are arranged in various architectures for responding to and processing the instructions that drive the system.

The computing arrangements are processing devices that operate automatically. In such regard, the computing arrangements may be equipped with artificial intelligence algorithms that are configured to respond to and to perform the instructions that drive the system based on data learning techniques. The computing arrangements devices capable of automatically responding and of performing instructions based on input provided from one or more users (namely, the worker nodes participating in the system). The worker nodes further include local databases to store data therein. Furthermore, the collective learning of the worker nodes is managed within the distributed computer system. Notably, the computing model is trained between the plurality of worker nodes in a manner that the intermediary computing models that have been partially trained are shared between the worker nodes and resources of worker nodes are utilized productively.

Moreover, the worker nodes are communicably coupled to each other via the data communication network. The data communication network allows for communication among the plurality of worker nodes. In other words, each of the plurality of worker nodes is capable of communicating with other worker nodes via the data communication network in order to facilitate training of the computing model. Notably, the data communication network refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, the data communication network uses wired or wireless communication that can be carried out via one or more known protocols.

The worker nodes are autonomous agents. Throughout the present disclosure the term "autonomous agents" as used herein, relates to computational entities or software programs that are designed to perform tasks or make decisions autonomously, without direct human intervention. The at least one autonomous agent could perceive their environment, analyze information, and take actions based on predefined rules, algorithms, or learning capabilities. Optionally, the at least one autonomous agent is at least one autonomous economic agent (AEA). In this regard, at least one autonomous micro-agent is optionally a micro autonomous economic agent. Optionally, the at least one autonomous economic agent (AEA) relates to a software module, or any device comprising at least one software module that is configured to execute one or more tasks. Such tasks may include communication of the at least one autonomous economic agents (AEAs) with each other, processing of information, and so forth. In an example, at least one of the autonomous agents are configured to use artificial intelligence (AI) algorithms and machine learning for the execution of the one or more tasks.

The term "service request" as used herein refers to a specific action or communication made by a user, typically through a digitalized system, to seek a particular service or assistance. Optionally, the service request can take various forms, such as direct interactions with digital interfaces like voice assistants (such as Siri, Alexa, ChatGPT, and so forth), inputting information into dedicated applications, or entering appointments into personal calendars. Optionally, the service request may include metadata, which is additional information accompanying the request, and is utilized by the Large Language Model (LLM) to provide relevant inferences or responses. Optionally, the service request may originate from individuals or authorized entities, including the digital twins or company Large Language Models (LLMs) empowered to request services on behalf of the clients, such as arranging travel services.

The term "processing arrangement" as used herein refers to a component designed to execute specific computational tasks or operations. The distributed computer system comprises the processing arrangement. The processing arrangement encompasses hardware, software, or a combination of both, programmed to perform predefined functions. The processing arrangement is used to carry out operations, transformations, or manipulations on data or other inputs to produce desired outputs. Optionally, the processing arrangement could be implemented using various computing devices, including computers, servers, processors, and dedicated hardware modules. Herein the "data" refers to information, records, or values that are collected, stored, processed, or analyzed within the distributed computer system. Optionally, the data include various types of information such as text, numbers, images, audio, video, and so forth.

The term "bloom tree" as used herein refers to a specialized data structure that organizes data hierarchically. The term "cryptographic hash value" as used herein refers to a fixed-size, alphanumeric string of characters generated by applying a specific mathematical algorithm known as a cryptographic hash function to input data. The hash functions are designed to take an arbitrary amount of data (input) and produce a unique, fixed-length output, which appears as a seemingly random sequence of characters. In this regard, the bloom tree is used to efficiently store and manage the cryptographic hash values representing the functionalities of the autonomous agents. Herein, the functionality of the autonomous agent refers to the specific capabilities, tasks, or functions that enable the at least one autonomous agent to serve the service request. Such functionalities may be enabling digital payments, generating product recommendations, resolving customer queries, and the like. Optionally, the functionality of the autonomous agent is related to current or previous tasks handled by the autonomous agent.

In this regard, the processing arrangement gathers information about the functionalities of the autonomous agents. Each of the autonomous agent has a unique functionality and needs to be stored and managed. For each of the functionalities, the processing arrangement produces the cryptographic hash value. Optionally, the cryptographic hash values are produced by applying hash function on the context of tasks being handled or previously handled by the autonomous agent. The cryptographic hash values are unique to each functionality and serve as a kind of fingerprint. The processing arrangement assembles the cryptographic hash values in order to generate the bloom tree.

Herein, the software framework encompasses any software abstraction which can have one or more software modules to provide generic and/or specific functionality (or specific functionalities). The software framework can be implemented by a distributed ledger arrangement. Optionally, the software framework is an agent framework (i.e., a framework that enables the creation of application-specific autonomous agents), an open economic framework (OEF) using autonomous economic agents, or a framework designed for developers (person or by artificial intelligence) to develop applications where both agents and a large language model are included in the application. The software framework provides the infrastructure and resources for the autonomous agents to communicate, negotiate, and exchange value in a secure and transparent manner. Optionally, the software framework includes the plurality of autonomous agents which are communicably interconnected using a direct network link (such as a decentralized computing network).

The software framework comprises the client-agent device. In this regard, the client-agent device is any device that acts as a client for the system, and in particular for the autonomous agents. Examples of the client-agent device include an organization on the cloud seeking a service, an end user with a phone seeking a service or a decentralized autonomous organization (DAO) seeking a service. In this regard, the client-agent device is configured to receive the service request.

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM). In this regard, for example, the software application could be a travel planning application. In such a case, a user may use the travel planning application on their smartphone to make a service request to book a hotel. Optionally, the software application could be a home automation hub that is communicably coupled to the user's device (such as a smartphone) through a wireless connection. Optionally, the cloud-based software application could be a Google Calendar. Optionally, the service request can be received from the digital twin that refers to a virtual representation of a given user. Optionally, the given digital twin employs simulation, machine learning and reasoning to assist in decision-making. For example, the digital representation could be a chatbot or an avatar that interacts with the distributed computer system on the user's behalf.

The term "objective" as used herein refers to a desired outcome or goal that the client-agent device aims to achieve based on the service request received therethrough. Optionally, the objective defines the purpose or intent behind the service request. In this regard, the objective is generated by the client-agent device according to the service request. The objective is typically formulated in a structured manner to provide clarity and guidance for the subsequent actions of the client-agent device and the plurality of autonomous agents in the distributed computer system. For example, the objective could be to book a flight to Paris, when the service request is to find and book a flight to Paris. In another example, the objective could be to schedule a meeting with an individual on a specific day. It will be appreciated that the client-agent device generates the objective to ensure an effective communication and a well-defined context for the subsequent actions taken by the plurality of autonomous agents in response to the service request.

Herein, the term "machine learning model" refers to a software component that facilitates machine learning processes within the distributed computer system. Moreover, the machine learning model is trained and improved based on data and inputs. The machine learning model may provide insights and information based on previous queries or experiences. In this regard, upon receiving the objective from the at least one autonomous agent, the at least one machine learning model is configured to generate the tasks related to the objective. For example, when the service request is regarding low inventory levels in a smart manufacturing facility and the objective is to rectify the low inventory levels, the machine-learning model comprised in the at least one autonomous agent receives said data and generate the tasks to replenish the needed supplies. In such a case, the tasks include identifying the specific items, calculating the optimal route to the production line, and ensuring timely restocking. The machine-learning model then sends the tasks to the at least one autonomous agent to ensure seamless production line operations. In such a case, optionally, the machine learning model might provide recommendations based on factors like availability, cost, or user preferences.

The term "pre-processing operation" refers to any collection or set of instructions executable by a processor to obtain the plurality of proof values. Additionally, the pre-processing operation is intended to encompass such instructions stored in storage medium such as random-access memory (RAM), a hard disk, optical disk, or so forth, and is also intended to encompass software stored on a read only memory (ROM) or so forth of the at least one autonomous agent. In an example, the pre-processing operation is potentially a one-time operation executed by each of the at least one autonomous agent before they are ready to initiate an interactive proof to verify the presence of the corresponding tasks by interacting with other autonomous agents.

The term "proof value" as used herein refers to a piece of data or information. Moreover, each proof value is associated with particular tasks or operations that the system needs to perform. The proof value act as guarantees that the tasks have been processed correctly. In this regard, after generating the proof values, the machine-learning model sends the proof values to the processing arrangement. The processing arrangement is responsible for further handling and potentially verifying the plurality of proof values.

The at least one machine-learning model, when in operation, carries out a set of actions or commands. The instructions are focused on setting up the processing arrangement to perform a specific task. The goal of the instructions is to find a group of autonomous agents that are related or connected to the given proof value. This is done by analyzing the proof value and its relationship with the bloom tree. The mapping involves associating the given proof value with a specific location or data point within the bloom tree. The at least one machine-learning model receive from the processing arrangement the list of associated autonomous agents to obtain a clear and defined set of autonomous agents that are deemed relevant or suitable for addressing the service request. The associated autonomous agents are configured to perform the tasks required to fulfil the service request. Additionally, the task can have multiple sub-tasks. Then accordingly the proof values of each subtask will be generated and matched with the bloom tree to find the associated autonomous agents.

Optionally, the pre-processing operation includes multiple hashing of the tasks depending upon an invertible bloom filter size to generate the given proof value. Herein, the multiple hashing of tasks refers to the process of applying a hash function repeatedly to a set of tasks. Moreover, each time a task is hashed, it undergoes a transformation that produces a fixed-size output, known as a hash value or hash code. Furthermore, the hash values are generated sequentially, with the output of one hashing operation becoming the input for the next. It will be appreciated that the multiple hashing enhances data integrity, reduces false positives, and improves the accuracy of identifying the tasks within the system. Herein, the invertible bloom filter size indicates a number of functionality representations of the autonomous agents, the invertible bloom filter could efficiently store. Optionally, the invertible bloom filter sizes are typically measured in terms of bits or bytes.

Optionally, the pre-processing operation includes multiple hashing of the list of subtasks to get the invertible bloom filter value to be sent to other autonomous agents to check if the other autonomous agents have the same functionality. Optionally, each subtask in the list has a corresponding proof value. Optionally, the system will identify each relevant/associated agents based on the proof value. Optionally, the proof value is calculated by hashing sub-task k times (depending upon the invertible bloom filter size).

Optionally, the given proof value is generated through the process of multiple hashing of tasks, which depends on the size of the invertible bloom filter. Optionally, the given proof value serves as a unique identifier or representation of the tasks and their associated functionality. Advantageously, the pre-processing ensures that similar functionalities or tasks are accurately identified and reduces the likelihood of false positives, which is essential for the system reliability.

Optionally, the given proof value corresponds to the invertible bloom filter data elements for the task. Herein, the invertible bloom filter data elements refer to the specific attributes, features, or information that define the task to be performed by the autonomous agent. Optionally, the invertible bloom filter data elements can include various parameters, descriptions, or metadata that uniquely describe the task, such as its requirements, inputs, expected outputs, or dependencies. Optionally, the given proof value is computed based on the invertible bloom filter data elements associated with the task, optionally through the multiple hashing. It will be appreciated that by having the given proof value correspond to the invertible bloom filter data elements, any change or modification to the task's attributes will result in a different proof value, ensuring the data integrity.

Optionally, the bloom tree is a tree structure where a node of the tree represents the invertible bloom filter data elements based on current functionality of the autonomous agent. In this regard, the bloom tree is described as the tree structure, meaning that the bloom tree is organized in a hierarchical manner similar to a traditional tree. Optionally, each node of the tree corresponds to the invertible bloom filter data elements related to the autonomous agent's functionality. Optionally, the hierarchical nature of the tree implies that the invertible bloom filter data elements are organized into levels, with higher-level nodes potentially representing broader or more general characteristics, while lower-level nodes represent finer details or specific functionalities. Optionally, the tree structure represents the current functionality of the autonomous agent, meaning that it reflects the autonomous agent's real-time capabilities and characteristics. Optionally, when the functionality changes, the tree structure can be updated to reflect the functionality changes.

Optionally, the bloom tree structure is like the known Merkle tree used for bandwidth-efficient and secure verification of the presence of a given transaction in a decentralized system. In an example, Merkle tree is a binary tree in which all leaf nodes (that are transactions such as $T_1$, $T_2$, $T_3$ to $T_8$) are associated with a hash (such as $H_1$, $H_2$, $H_3$ to $H_8$), and all none-leaf nodes are associated with a hash (such as $H_{1,2}$, $H_{3,4}$, $H_{5,6}$, $H_{6,7}$, $H_{1,2,3,4}$ and $H_{5,6,7,8}$), that is formed from the hashes of its child nodes. Moreover, a root hash of the Merkle tree is obtained by hashing the non-leaf nodes (such as $H_{1,2,3,4}$, and $H_{5,6,7,8}$). To verify that a single transaction is present in the Merkle tree, a series of hashes are provided, which when are hashed with the transaction hash (e.g., a hash of transaction ID), a root hash of the Merkle tree is recreated. Moreover, this series of hashes is also known as a Merkle proof.

In the present disclosure, the bloom tree is used which combines the invertible bloom filters with Merkle trees. Moreover, using the bloom tree, the presence or absence of any existing agent's functionality is identified and communicated in a secure and bandwidth efficient way. Further, the use of invertible bloom filter helps in identifying accurately if an autonomous agent with the same functionality as required to fulfil a task or sub-task of a service request is present or not. In. this regard, in the distributed computer system, by defining the functionality (or capability) of each autonomous agent (AA) as an invertible bloom filter, the probability of identifying an existing autonomous agent (AA) matching with the service request will be 1 and the probability of identifying an autonomous agent (AA) no longer existing in the tree will be 0.

Optionally, the distributed computer system operates to configure each autonomous agent of the plurality of autonomous agents to execute the pre-processing operation further to calculate the cryptographic hash value representing the current functionality of an autonomous agent. Each autonomous agent then shares the cryptographic hash value with the processing arrangement dynamically as soon as a new service request is received. The processing arrangement is then configured to generate a bloom tree representing the functionalities of the autonomous agents in the distributed computer system. By configuring the autonomous agents to calculate their cryptographic hash values reduces the processing overload for the processing arrangement, reduces the data communication overhead as the cryptographic hash values are small size. Optionally, the autonomous agents are configured to share the calculated cryptographic hash values representing the functionality of the autonomous agents with the processing arrangement only if the there is a change or update in the functionality of the autonomous agent from the one previously shared. The distributed computer system thus makes an economical use of the memory and communication resources as only the cryptographic hash value representing the functionality are stored and communicated instead of full functionality. Further, by sharing the functionality of the autonomous agents using cryptographic hash values using invertible bloom filter, the security of the distributed system is improved.

Optionally, the at least one autonomous agent is configured to execute a build executor module to compose each autonomous agent associated with the objective into a further autonomous agent. The term "build executor software module" as used herein refers to a component within the software framework that is specifically designed to handle the composition and execution of tasks within the distributed computer system. The build executor software module is responsible for composing each task associated with the objective in a specific order. Optionally, the build executor software module ensures that the tasks are organized and arranged according to a predefined sequence or priority.

Moreover, the build executor software module also composes each autonomous agent associated with the objective into a further autonomous agent. The further autonomous agent can be understood as a composite autonomous agent that combines the capabilities and functionalities of the individual associated with the objective. Furthermore, to maintain the security and integrity of the distributed computer system, the build executor software module encrypts access to the further autonomous agent. Optionally, by encrypting the access, it ensures that unauthorized entities cannot tamper with or manipulate the further autonomous agent. This security measure safeguards the execution of tasks and protects the distributed computer system from potential threats or unauthorized access. Optionally, the step of encrypting the access to the further autonomous agent need not necessarily be implemented in all embodiments of the present disclosure. In other words, such encryption may be performed only optionally.

Optionally, the composability of tasks is how the tasks are combined to fulfil a complex service request. Optionally, the further autonomous agent is a combination of two or more autonomous agents to perform complex action. Optionally, when an existing autonomous agent cannot be used to perform the task associated with the objective of service, a new agent is created. In the distributed computer system proposed, creation of new agent is validated by the Large Language Model (LLM) and/or ML models and the agents communicate within themselves using peer to peer encrypted communication. The plurality of autonomous agents participating in execution of tasks associated with the objective of the service request use encryption methods to communicate within themselves and other autonomous agent who are not participating in the tasks of the service request are blocked from communication to prevent any third-party access.

Optionally, the creation of new agent is treated as a block of a blockchain network, and after validation by the ML model and/or LLM and/or by existing agents using association with the task, each new agent created is appended to the chain of agents just like new block is connected to the existing blocks of a blockchain. Similar, to the blockchain network, once an agent has been created after validation, the distributed computer system may have the agent holding the transaction information such as metadata associated with the task. The technical effect of treating the agents as blocks of blockchain is that the proposed system provides a way such that tampering with the functioning of agent can be avoided as it is almost impossible to modify the block once the transaction has been validated. With such a distributed computer system, the service tasks are performed as planned and third-party attacks can be avoided. New agents created are cryptographically linked together just like blocks of a blockchain and are immutable, the functioning of agents cannot be altered. The distributed computer system provides a secure and transparent way to automatically execute the service request.

Optionally, the at least one autonomous agent is configured to execute a protocol generation module to generate at least one protocol specification for the execution of each task by the at least one autonomous agent associated with the task, and wherein the at least one protocol specification is generated using a domain-independent protocol specification language. The term "domain-independent protocol specification language" as used herein refers to a formal language that enables the definition of protocols for interactions across a plurality of problem domains. In this regard, the domain-independent protocol specification language is used to describe the format, structure, and rules for communication between at least one autonomous agent, and between the client-agent device and the at least one autonomous agent, regardless of the specific application domain or context. It will be appreciated that the domain-independent protocol specification language provides a standardized way of defining protocols that enables interoperability and seamless communication among the plurality of autonomous agents in the distributed computer system, regardless of the domain thereof. Moreover, the domain-independent protocol specification language in the software framework promotes fairness, transparency, and efficiency in the distributed computer system. Furthermore, the domain-independent protocol specification language enables the distributed computer system to become scalable for providing multi-domain services.

Optionally, the domain-independent protocol specification language is stored in a form of a set of instructions, in at least one memory device of the data communication network. Optionally, the at least one memory device may be a physical memory device, such as a hard drive or a flash drive, or a virtual memory device, such as a cloud-based server.

The term "protocol generation module" as used herein refers to a software tool that generates protocol(s) for the autonomous agents using the domain-independent protocol specification language. The term "protocol" as used herein refers to an implementation of the rules and guidelines described in a protocol specification. In other words, the at least one protocol is one of the critical building blocks and abstractions that define communications of the client-agent device. The at least one protocol of the client-agent device defines interactions of the client-agent device with other autonomous agents amongst the plurality of autonomous agents. Moreover, the at least one protocol defines how messages are encoded for a transportation thereof.

In this regard, when the at least one autonomous agent receives the task associated with the service request, the at least one autonomous agent leverages the protocol generation module. Moreover, the protocol generation module uses the domain-independent protocol specification language that is not restricted to any particular domain. Then, the protocol generation module generates the at least one protocol specification that outlines how the at least one autonomous agent should carry out the task. Optionally, the at least one protocol specification serves as a detailed roadmap, guiding the at least one autonomous agent through the execution of the task step by step.

Optionally, the further autonomous agent is configured to implement at least one protocol specification to fulfil the service request by the client agent device. In this regard, the further autonomous agent, which is a composite of the autonomous agent(s) associated with the objective, is configured to implement the at least one protocol specification generated by the distributed computer system. Moreover, the further autonomous agent executes the service request associated with the objective based on the defined protocol specification. Furthermore, the further autonomous agent automatically executes the service request, carrying out the necessary actions or operations to fulfil the service request.

Optionally, the list of associated agents corresponds to the autonomous agents that can be composed to fulfil the service request, or the list of autonomous agents that can work together to fulfil the service request or the list of autonomous agents whose functionalities need to be upgraded to fulfil the service request. In this regard, the system maintains the list of associated agents that contains information about various autonomous agents available in the system. Optionally, the list can be used to identify combinations of agents that can be composed to fulfill the service request. For example, if the service request involves complex tasks, the system can identify individual agents with complementary capabilities and compose them into a larger entity capable of handling the service request. Optionally, the list can facilitate collaboration among the autonomous agents. For example, if multiple autonomous agents have complementary skills, the multiple autonomous agents can work together to fulfill the service request more effectively than if each of the autonomous agent is operated in isolation.

Optionally, the list can help identify the autonomous agents whose functionalities may need to be upgraded to meet the requirements of the specific service request. For example, if the service request demands advanced capabilities that some autonomous agents lack, the system can identify such autonomous agents for potential upgrades. In another example, when the service request involves complex mathematical calculations. In such a case, the list reveals that some autonomous agents lack advanced mathematical capabilities. The system identifies the autonomous agents and schedules updates to enhance the mathematical processing abilities thereof, ensuring the autonomous agents can contribute effectively to future service requests.

Optionally, the autonomous agents whose functionalities need to be upgraded are restored back to original state using reverse operation of inverse bloom filter after fulfilment of the service request. In this regard, the system identifies the autonomous agents whose functionalities need to be upgraded based on the requirements of the service request. After the service request has been fulfilled and the autonomous agents have undergone upgrades, the system makes use of the reverse operation of the inverse bloom filter. It will be appreciated that the inverse bloom filter and its reversible properties allows for an efficient restoration process. Optionally, the inverse bloom filter ensures that the autonomous agents are reverted to their original state without excessive computational overhead. Optionally, the inverse bloom filter ensures that the autonomous agents are returned to their original state, with their initial functionalities intact and ready for new tasks. Optionally, the inverse bloom filter ensures that the autonomous agents can adapt to various service requests without accumulating a history of modifications that may not be relevant for future tasks.

In this regard, the invertible bloom filter uses a three-component data structure string a key, a value and a count. When a (key, value) pair needs to be stored, hashing operation is performed k times (depending upon the filter size) on the key to store the value in each of the location in the filter and the count is also incremented when the given value is stored at a location. Optionally, a reversible storage function is used for storing the value. In an example, the reversible storage function is a logical exclusive-OR (XOR) function. Optionally, an exclusive-OR (XOR) function is executed on the value for the reverse operation. Optionally, in such a case, for the value when performing an XOR with another value then performing an XOR operation a second time returns to the original value. The use of reversible storage function provides the discloses system a flexibility to restore the functionality of the autonomous agent.

It will be appreciated that when all keys are distinct, the reverse operation enhances the efficiency of the system.

The present disclosure also relates to the method of operating the distributed computer system as described above. Various embodiments and variants disclosed above, with respect to the aforementioned the distributed computer system, apply mutatis mutandis to the method of operating the distributed computer system.

Optionally, the method further comprises executing a build executor module by the at least one autonomous agent to compose each autonomous agent associated with the objective into a further autonomous agent.

Optionally, the method further comprises executing a protocol generation module by the at least one autonomous agent to generate at least one protocol specification for the execution of each task by the at least one autonomous agent associated with the task, and wherein the at least one protocol specification is generated using a domain-independent protocol specification language.

Optionally, the method further comprises configuring the further autonomous agent to implement at least one protocol specification to fulfil the service request by the client agent device.

Optionally, the pre-processing operation includes multiple hashing of the tasks depending upon an invertible bloom filter size to generate the given proof value.

Optionally, the given proof value corresponds to the invertible bloom filter data elements for the task.

Optionally, the bloom tree is a tree structure where a node of the tree represents the invertible bloom filter data elements based on current functionality of the autonomous agent.

Optionally, the list of associated agents corresponds to the autonomous agents that can be composed to fulfil the service request, or the list of autonomous agents that can work together to fulfil the service request or the list of autonomous agents whose functionalities need to be upgraded to fulfil the service request.

Optionally, the autonomous agents whose functionalities need to be upgraded are restored back to original state using reverse operation of inverse bloom filter after fulfilment of the service request.

Optionally, the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

DETAILED DESCRIPTION OF THE DRAWINGS

Referring to FIG. 1, illustrated is a distributed computer system 100, in accordance with an embodiment of the present disclosure. The distributed computer system 100 comprises a plurality of worker nodes 102A-C that are coupled together via a data communication network 104 to exchange data therebetween, wherein the plurality of worker nodes 102A-C include computing arrangements and local databases to process and store data therein, wherein the plurality of worker nodes 102A-C are plurality of autonomous agents (AAs), wherein the distributed computer system 100 is configured to use the plurality of worker nodes 102A-C for fulfilling a service request. The distributed computer system 100 further comprises a processing arrangement 108 configured to generate a bloom tree 110 comprising cryptographic hash values, wherein each cryptographic hash value represents a functionality of an autonomous agent of the plurality of autonomous agents. The distributed computer system 100 comprises a software framework 112, wherein the software framework 112 comprises: a client-agent device 114 configured to receive the service request, to generate an objective associated with the service request and to send the objective to at least one autonomous agent. The distributed computer system 100 comprises at least one machine-learning model 118 comprised in the at least one of the autonomous agents configured to generate tasks related to the objective received from the at least one autonomous agent and to send the tasks to the at least one autonomous agent, execute a pre-processing operation to generate a plurality of proof values corresponding to the tasks and to send the plurality of proof values to the processing arrangement 108, execute instructions to configure the processing arrangement 108 to identify a list of associated autonomous agents by mapping a given proof value to the bloom tree, and receive from the processing arrangement 108 the list of associated autonomous agents, wherein the associated autonomous agents are configured to perform the tasks required to fulfil the service request.

Optionally, the at least one autonomous agent is configured to execute a build executor module 120 to compose each autonomous agent associated with the objective into a further autonomous agent 122. Optionally, the at least one autonomous agent is configured to execute a protocol generation module 124 to generate at least one protocol specification 126 for the execution of each subtask by the at least one autonomous agent associated with the task, wherein the protocol specification is generated using the domain-independent protocol specification language. Optionally, the further autonomous agent 122 is configured to implement the at least one protocol specification 126 to fulfil the service request by the client-agent device 114.

Figure 2A:
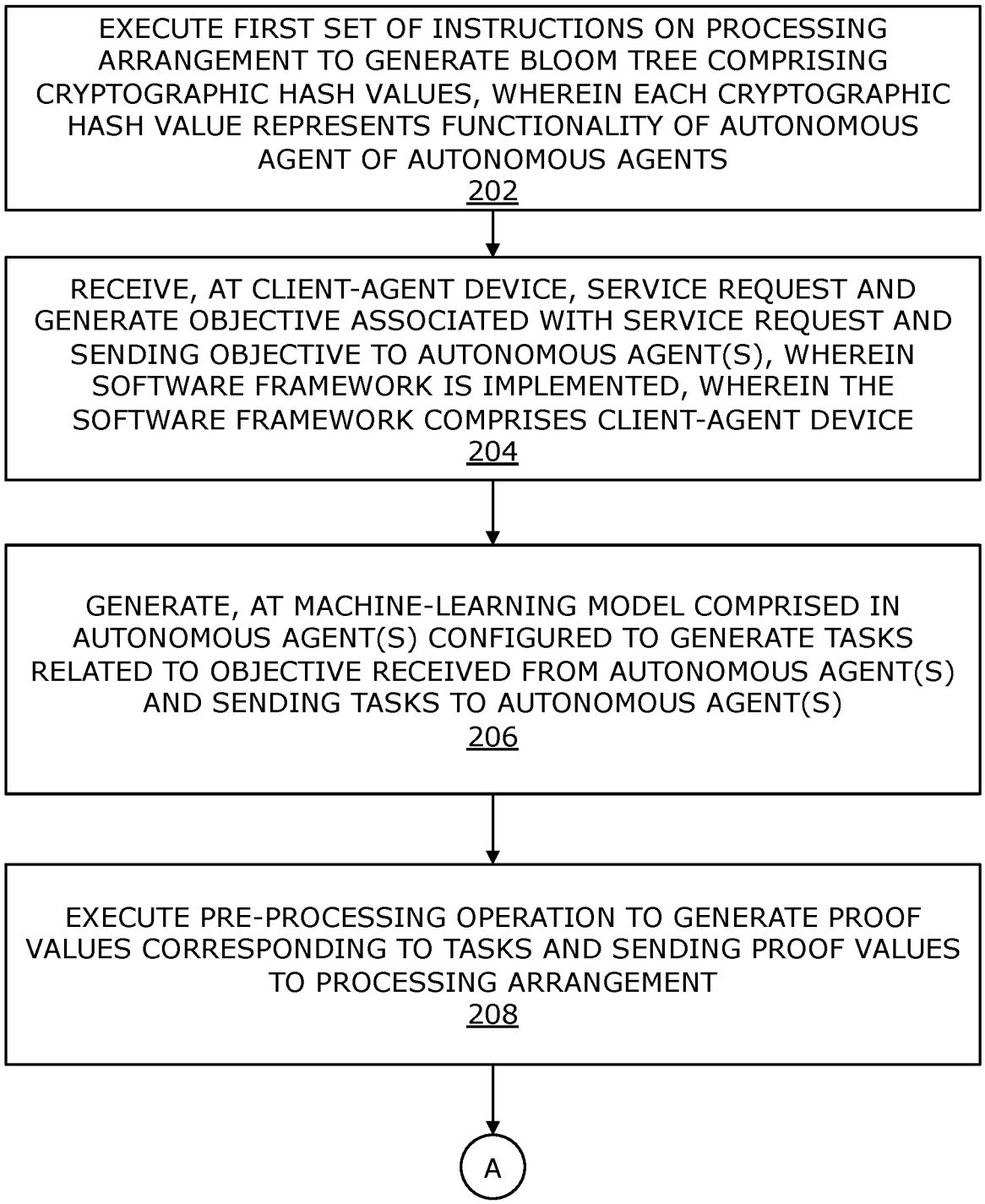
FIGS. 2A and 2B is an illustration of a flowchart illustrating steps of a method of operating a distributed computer system, in accordance with an embodiment of the present disclosure.
Figure 2B:
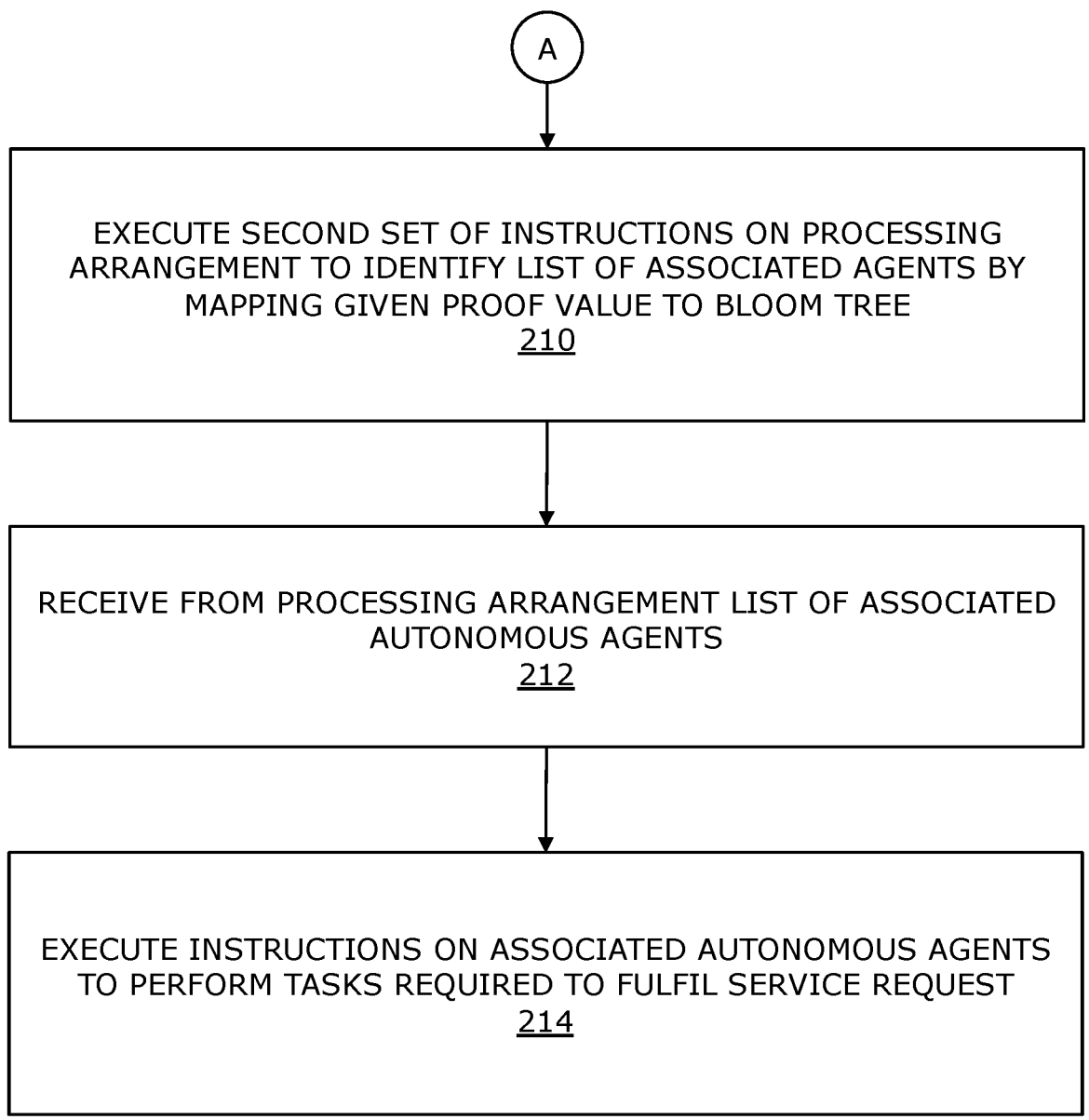

Referring to FIG. 2, illustrated is a flowchart illustrating steps of a method of operating a distributed computer system, in accordance with an embodiment of the present disclosure. The distributed computer system comprises a plurality of worker nodes that are coupled together via a data communication network to exchange data therebetween, wherein the worker nodes include computing arrangements and local databases to process and store data therein, wherein the plurality of worker nodes is plurality of autonomous agents (AAs), wherein the distributed computer system is configured to use the plurality of worker nodes for fulfilling a service request. At step 202, there is executed a first set of instruction on a processing arrangement to generate a bloom tree comprising cryptographic hash values, wherein each cryptographic hash value represents a functionality of an autonomous agent of the plurality of autonomous agents. At step 204, there is received, at a client-agent device, the service request and generated an objective associated with the service request and sent the objective to an autonomous agent device, wherein a software framework is implemented, wherein the software framework comprises the client-agent device. At step 206, there is generated, at a machine-learning model comprised in at least one of the autonomous agents configured to generate tasks related to the objective received from the at least one autonomous agent and sending the tasks to the at least one autonomous agent. At step 208, there is executed, a pre-processing operation, using the at least one autonomous agent, to generate a plurality of proof values corresponding to tasks and sending the proof values to the processing arrangement. At step 210, there is executed, a second set of instructions, using the at least one autonomous agent, on the processing arrangement to identify a list of associated agents by mapping the proof value to the bloom tree. At step 212, there is received, using the at least one autonomous agent, from the processing arrangement the list of associated agents. At step 214, there is executed, the instructions on the associated agents to perform the tasks required to fulfil the service request.

The aforementioned steps are only illustrative and other alternatives can also be provided where one or more steps are added, one or more steps are removed, or one or more steps are provided in a different sequence without departing from the scope of the claims herein.

The invention claimed is:

1. A distributed computer system for managing and recording the functionalities of a plurality of autonomous agents, the system comprises:
   a plurality of worker nodes that are coupled together via a data communication network to exchange data therebetween, wherein the plurality of worker nodes include computing arrangements and local databases to process and store data therein, wherein the plurality of worker nodes are the plurality of autonomous agents (AAs), and wherein the distributed computer system is configured to use the plurality of worker nodes for fulfilling a service request;
   a processing arrangement configured to generate a bloom tree comprising cryptographic hash values, wherein each cryptographic hash value represents a functionality of an autonomous agent of the plurality of autonomous agents, wherein the functionality of each of the autonomous agents of the plurality of autonomous agents is represented by an invertible bloom filter, wherein the bloom tree combines the invertible bloom filter with Merkle tree, wherein the bloom tree comprises leaf nodes associated with transaction hashes and non-leaf nodes associated with hashes formed from child nodes, and wherein a root hash of the bloom tree is obtained by hashing the non-leaf nodes,
   a software framework, wherein the software framework comprises:
      a client-agent device configured to receive the service request, to generate an objective associated with the service request, and to send the objective to at least one autonomous agent of the plurality of autonomous agents and
      at least one machine-learning model comprised in the at least one autonomous agent of the plurality of autonomous agents, wherein the machine-learning model is configured to:
         receive the objective from the at least one autonomous agent of the plurality of autonomous agents,
         generate tasks related to the objective received from the at least one autonomous agent of the plurality of autonomous agents, and
         send the generated tasks to the at least one autonomous agent of the plurality of autonomous agents,
         wherein the at least one autonomous agent of the plurality of autonomous agents is configured to:
            execute a pre-processing operation to generate a plurality of proof values corresponding to the tasks and to send the plurality of proof values to the processing arrangement, wherein the pre-processing operation comprises multiple hashing of the tasks based on an invertible bloom filter size to generate a given proof value of the plurality of proof values, and wherein the given proof value of the plurality of proof values corresponds to an invertible bloom filter data elements for the task,
            execute instructions to configure the processing arrangement to identify a list of associated autonomous agents of the plurality of autonomous agents by mapping a the given proof value to the bloom tree, and
            receive from the processing arrangement the list of associated autonomous agents of the plurality of autonomous agents, wherein the associated autonomous agents of the plurality of autonomous agents are configured to perform the tasks required to fulfil the service request by executing at least one action.

2. The distributed computer system of claim 1, wherein the at least one autonomous agent of the plurality of autonomous agents is configured to execute a build executor module to compose each autonomous agent associated with the objective into a further autonomous agent.

3. The distributed computer system of claim 1, wherein the at least one autonomous agent of the plurality of autonomous agents is configured to execute a protocol generation module to generate at least one protocol specification for the execution of each task by the at least one autonomous agent of the plurality of autonomous agents associated with the task, and wherein the at least one protocol specification is generated using a domain-independent protocol specification language.

4. The distributed computer system of claim 2, wherein the further autonomous agent is configured to implement at least one protocol specification to fulfil the service request by the client agent device.

5. The distributed computer system of claim 1, wherein the bloom tree is a tree structure where a node of the tree represents the invertible bloom filter data elements based on current functionality of the autonomous agent of the plurality of autonomous agents.

6. The distributed computer system of claim 1, wherein the list of associated agents corresponds to the autonomous agents of the plurality of autonomous agents that can be composed to fulfil the service request, or the list of autonomous agents of the plurality of autonomous agents that can work together to fulfil the service request or the list of autonomous agents of the plurality of autonomous agents whose functionalities need to be upgraded to fulfil the service request.

7. The distributed computer system of claim 6, wherein the autonomous agents of the plurality of autonomous agents whose functionalities need to be upgraded are restored back to original state using reverse operation of inverse bloom filter after fulfilment of the service request.

8. The distributed computer system of claim 1, wherein the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

9. A method of operating a distributed computer system for managing and recording the functionalities of a plurality of autonomous agents that comprises a plurality of worker nodes that are coupled together via a data communication network to exchange data therebetween, wherein the plurality of worker nodes include computing arrangements and local databases to process and store data therein, wherein the plurality of worker nodes are the plurality of autonomous agents (AAs), and wherein the distributed computer system is configured to use the plurality of worker nodes for fulfilling a service request, the method further comprising:

executing a first set of instructions on a processing arrangement to generate a bloom tree comprising cryptographic hash values, wherein each cryptographic hash value represents a functionality of an autonomous agent of the plurality of autonomous agents, wherein the functionality of each of the autonomous agents of the plurality of autonomous agents is represented by an invertible bloom filter, wherein the bloom tree combines the invertible bloom filter with Merkle tree, wherein the bloom tree comprises leaf nodes associated with transaction hashes and non-leaf nodes associated with hashes formed from child nodes, and wherein a root hash of the bloom tree is obtained by hashing the non-leaf nodes, receiving, at a client-agent device, the service request, generating an objective associated with the service request, and sending the objective to at least one autonomous agent of the plurality of autonomous agents, wherein a software framework is implemented, wherein the software framework comprises the client-agent device, receiving, at a machine-learning model comprised in the at least one of the autonomous agent of the plurality of autonomous agents, the objective from the at least one autonomous agent of the plurality of autonomous agents, generating tasks related to the objective received from the at least one autonomous agent of the plurality of autonomous agents, and sending the generated tasks to the at least one autonomous agent of the plurality of autonomous agents, configuring the at least one autonomous agent of the plurality of autonomous agents for:
  executing a pre-processing operation to generate a plurality of proof values corresponding to tasks and sending the plurality of proof values to the processing arrangement, wherein the pre-processing operation comprises multiple hashing of the tasks based on an invertible bloom filter size to generate a given proof value of the plurality of proof values, and wherein the given proof value of the plurality of proof values corresponds to an invertible bloom filter data elements for the task,
  executing a second set of instructions on the processing arrangement to identify a list of associated agents of the plurality of autonomous agents by mapping the given proof value to the bloom tree, and
  receiving from the processing arrangement the list of associated autonomous agents of the plurality of autonomous agents, and
  executing the instructions on the associated autonomous agents of the plurality of autonomous agents to perform the tasks required to fulfil the service request by executing at least one action.

10. The method of claim 9, further comprising executing a build executor module by the at least one autonomous agent of the plurality of autonomous agents to compose each autonomous agent associated with the objective into a further autonomous agent.

11. The method of claim 9, further comprising executing a protocol generation module by the at least one autonomous agent of the plurality of autonomous agents to generate at least one protocol specification for the execution of each task by the at least one autonomous agent of the plurality of autonomous agents associated with the task, and wherein the at least one protocol specification is generated using a domain-independent protocol specification language.

12. The method of claim 10, further comprising configuring the further autonomous agent to implement at least one protocol specification to fulfil the service request by the client agent device.

13. The method of claim 9, wherein the bloom tree is a tree structure where a node of the tree represents the invertible bloom filter data elements based on current functionality of the autonomous agent of the plurality of autonomous agents.

14. The method of claim 9, wherein the list of associated agents corresponds to the autonomous agents of the plurality of autonomous agents that can be composed to fulfil the service request, or the list of autonomous agents of the plurality of autonomous agents that can work together to fulfil the service request or the list of autonomous agents of the plurality of autonomous agents whose functionalities need to be upgraded to fulfil the service request.

15. The method of claim 9, wherein the autonomous agents of the plurality of autonomous agents whose functionalities need to be upgraded are restored back to original state using reverse operation of inverse bloom filter after fulfilment of the service request.

16. The method of claim 9, wherein the service request is received from at least one of: a software application executing on a device of a user, a software application executing on a computing device that is communicably coupled to a device of a user, a cloud-based software application, a digital twin of a user, a digital representation of a user, an artificial intelligence model (AI-model) based on a Large Language Model (LLM).

* * * * *